Jan. 15, 1929.                                                              1,699,397
                            J. H. KLEIN
                           TRAILER HITCH
                        Filed July 30, 1927

Inventor
John H. Klein.
By J. J. O'Brien
Attorney

Patented Jan. 15, 1929.

1,699,397

UNITED STATES PATENT OFFICE.

JOHN HANS KLEIN, OF DENVER, COLORADO.

TRAILER HITCH.

Application filed July 30, 1927. Serial No. 209,523.

This invention relates to improvements in trailer hitches and has reference more particularly to an improvement of the invention described and claimed in U. S. Letters Patent 1,481,376, granted to me on January 22, 1924.

It is quite customary to employ trailers in connection with big freight trucks for various reasons, among which may be mentioned that the truck itself is quite expensive, whereas the trailer can be bought for less money and then when trailers are employed it is possible to load the trailers and to unload them while the truck is engaged in other work, and thereby increasing the effective time of the truck. This increases the efficiency as the truck is thereby enabled to do more useful work than when the load is carried on the truck itself as often is the case.

In the patent above identified, I have described and claimed a tractor hitch which is so constructed that the force required to pull the tractor is resolved into a horizontal and a vertical component. The vertical component is directed downwardly at a point directly above the rear axle so that it serves to increase the weight of the wheels on the ground and in this manner to increase the traction between the wheels and the road bed.

In this application I employ the same general construction, but have added to the device shown in the patent several features of construction that improves the efficiency of the hitch and simplifies the hitching and unhitching of the tractor.

In order to describe my present invention with the greatest possible clearness so that it may be readily understood, and so that the improvements over the patent above identified will become apparent, reference will now be had to the accompanying drawing in which the present embodiment has been illustrated and in which.

Figure 1:
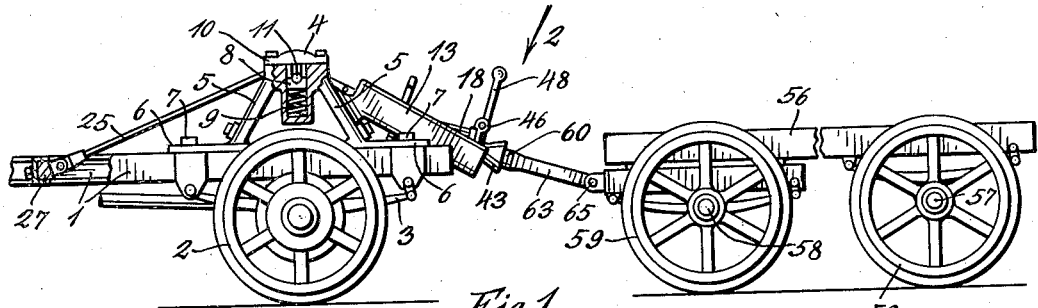
Fig. 1 is a side elevation showing the rear portion of the truck and the trailer attached to it.
Figure 2:
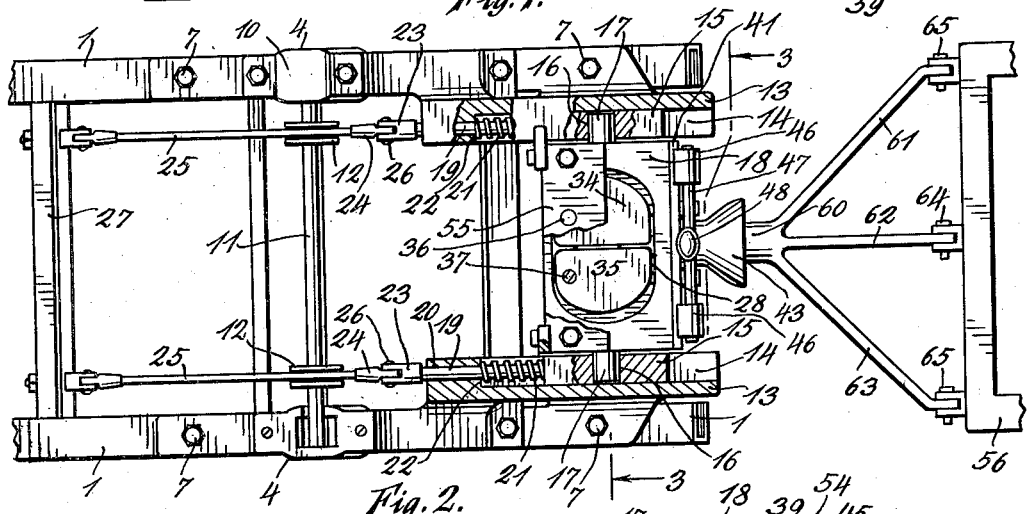
Fig. 2 is a plan view to a somewhat larger scale, this view is taken in the direction of the arrow 2 in Fig. 1.

In the drawing reference numeral 1 designates the side members of the chassis frame of the truck and reference numeral 2 designates the rear wheel of the truck. The chassis frame is supported on springs 3 in the usual manner. Secured to the upper side of each of the side frames 1 is a supporting bracket 4. This bracket has two downwardly extending supporting members 5 which terminate in flat base portions 6 that are secured to the side members 1 by means of bolts 7. The upper part of each supporting bracket has a downwardly extending recess within which is slidably mounted a bearing block 8 that rests upon the upper end of a compression spring 9. This recess is covered by means of a removable cover 10. A shaft 11 extends transversely of the truck and has its ends resting on the bearing blocks 8 in the manner indicated in Fig. 1. Pulleys 12 are secured to the shaft 11 in the manner shown in Fig. 2. When the shaft is subjected to a strong downward pressure, the springs 9 will yield somewhat and thereby prevent undue strains from being applied to the different parts. Secured to each rear arm 5 of the supporting brackets 4, is a guide 13. This guide is provided with a slot 14 within which is slidably mounted a block 15 that is provided with bearings 16 for the reception of the trunnion 17 that extends from each side of the steel casting 18 which comprises the body member of the coupling device. Secured to the upper end of each block 15 are rods 19 that pass through openings 20 in the upper end of the guides 13 in the manner shown most clearly in Fig. 2. Springs 21 surround the rods 19 and are located between the upper ends of the slidable blocks 15 and the shoulders 22 at the upper end of the grooves 14. These springs serve as buffers when the truck is hitched to the trailer in a manner which will become apparent as the description proceeds. The upper ends of the rods 19 are provided with coupling members 23, to which the coupling members 24 on the rear ends of the cables 25 are connected by means of pivot pins 26. Cables 25 pass over the tops of the pulleys 12 and have their front ends anchored to a transverse bar 27 in the manner shown in Figs. 1 and 2 and it is now apparent that the blocks 15 will be prevented from moving rearwardly by the action of the cables 25. If a sufficient force is applied to the blocks 15, this force will be resolved into a horizontal and a vertical component and the latter will cause the spring 9 to compress so as to permit the blocks 15 to slide to a small extent within the grooves 14. The vertical component to which I have just made reference is, of course, directed downwardly and is added to the weight supported by the wheels and therefore has the same effect in increasing the traction between the wheels and the roadway as a corresponding weight would have. This resolution of the tractive effort into two components is taken advantage of in a manner that will be referred to hereinafter.

Figures 3, 4:
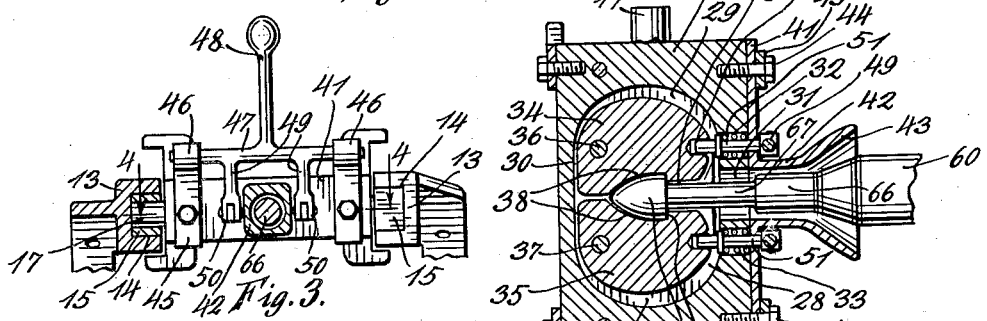
Fig. 3 is a section taken on line 3—3, Fig. 2.
Fig. 4 is a section taken on line 4—4, Fig. 3 and shows the coupling device in operative position.
Figures 5, 6:
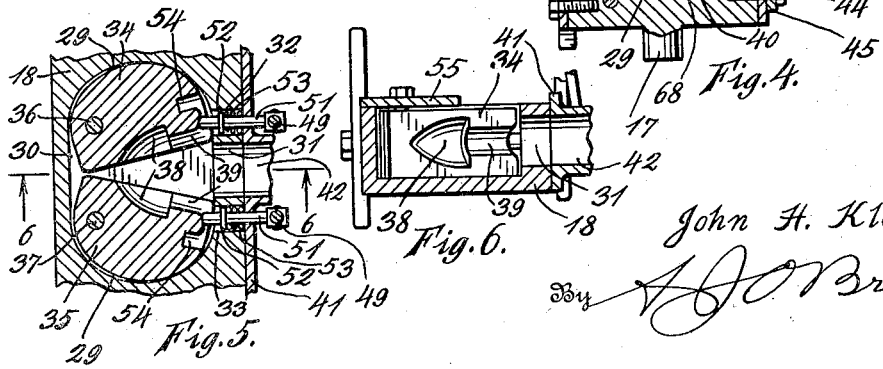
Fig. 5 is a section similar to that shown in Fig. 2 and shows the coupling members in inoperative position.
Fig. 6 is a section taken on line 6—6, 60 Fig. 5.

The body member 18, as above intimated, may be made of cast steel or of any other suitable material and is provided with an opening 28 which is bounded by two arcuate end walls that are connected on the front side by means of a straight wall 30. The corresponding straight wall on the rear side is provided with three perforations 31, 32 and 33. Located within the opening 28 are two massive steel jaws 34 and 35 which are pivoted respectively at 36 and 37. These jaws are provided on their adjacent surfaces with recesses 38 and 39. The recesses 38 are complementary and when the parts are moved into the position shown in Fig. 4, these recesses form an opening having a shoulder 40 about its rear end. The recesses 39 form a cylindrical opening that communicates with the opening in front of the shoulder 40. The jaws 34 and 35 are of such dimensions and so shaped that they can be moved about their pivot pins from the position shown in Fig. 4 to that shown in Fig. 5.

Secured to the rear side of the body member 18 is a plate 41 that is provided near its center with a hollow rearwardly extending projection 42 whose rear end is outwardly flared in the manner indicated by numeral 43. The plate 41 is secured to member 18 by means of bolts 44 and these also serve to clamp in place two upwardly extending brackets 45. Brackets 45 are provided at their upper ends with cylindrical portions 46 that have openings which form bearings for the ends of the shaft 47. Formed integrally with this shaft is an upwardly extending handle 48 and two downwardly extending arms 49. The lower ends of arms 49 are forked in the manner indicated by numeral 50. Pins 51 (Figs. 4 and 5) extend through the openings 32 and have their rear ends pivotally attached to the forked lower ends 50 of the arms 49. Each of the pins 51 have a collar 52 and carry a compression spring 53 one end of which abuts the forward surface of the plate 41 and the other end the collar 52 in the manner shown in Fig. 5. These springs exert a force tending to move the pins 51 forwardly, each of the jaw members 34 and 35 are provided with openings 54 that are adapted to receive the ends of the pins in the manner shown in Fig. 4 when the jaws are in operative position. When the parts are in the position shown in Fig. 4, the pins may be withdrawn from the openings 54 by rotating the shaft 47 in such a way as to cause the pins to move rearwardly against the tension of the springs 32.

A cover plate 55 extends over the upper part of the member 18 and entirely covers the opening 28 so as to prevent dust and dirt from entering the same.

The trailer has been shown as consisting of a frame 56 that is supported by a rear axle 57 and a front axle 58 to which wheels 59 are rotatably secured. Secured to the front of this trailer is a short tongue 60. The rear end of this tongue has three arms or branches 61, 62 and 63. The arm 61 extends rearwardly in a straight line and is pivoted to the frame by means of a pin 64. Arms 61 and 63 are outwardly and rearwardly inclined and are secured to the frame by pivot pins 65. The front end of this tongue portion has two cylindrical sections 66 and 67 and the latter terminates in an enlarged somewhat conical head 68, whose rear diameter is larger than the diameter of the part 67 and therefore is connected to the latter by means of a shoulder that cooperates with the shoulder 40 in the jaw members. When the parts are in the position shown in Fig. 4, the tongue is held positively against withdrawal by the action of the jaws 34 and 35. As these jaws cannot spread apart, due to the action of the pins 51, it is evident that the coupling is very positive and reliable. When the truck is to be uncoupled from the trailer, the operator merely grasps the lever 48 and rotates the shaft 47 in such a direction that the pins 51 will be withdrawn from the holes 54. This permits the jaw members to spread apart sufficiently to enable the enlarged head 68 to pass rearwardly so as to disconnect the trailer from the truck. When the truck and trailer are to be coupled, the tongue portion is held at the proper level and the truck is backed against the trailer, as the head 68 passes inwardly through the opening in the tubular member 42, it can also pass in between the open jaws 34 and 35 and when it abuts the forward end of the recess 38, the jaws will be moved from the position shown in Fig. 5 to the position shown in Fig. 4 and become locked by the action of the pins 55.

During the coupling operation and during such times as the brakes are suddenly applied to the truck, the springs 21 act to prevent sudden shocks.

If we now assume a case in which the trailer is loaded with a heavy load and is being pulled up a steep grade by means of a truck, it will be evident that a large tractive force is exerted. This force is communicated to the frame of the truck by means of the cables 25 and since these cables do not run in a straight line, but pass upwardly over the pulleys 12, this force, as above intimated, is resolved into a horizontal component which tends to pull the trailer and a vertical component which acts to increase the force with which the rear wheels 2 engage the roadway. In this manner the traction between the truck and the roadway is increased whenever this is made necessary due to some heavy pull.

By means of my improved coupling device, it is apparent that the trailer and the truck can be very easily coupled and uncoupled thereby saving a large amount of labor and time.

Although this coupler has been shown and described in connection with a truck and a trailer, it is evident that it can be employed in connection with any other vehicles and is especially well adapted for use in connection with railway cars and I therefore want it understood that the above explanation is to be considered as illustrative only and is not to be understood as in any way limiting the invention.

Having described my invention, what I claim as new is:

1. In a trailer hitch having a bracket secured to opposite sides of a truck chassis, a shaft having its ends supported on said brackets, and tension members having their forward ends secured to the chassis frame and passing over the shaft, means for guiding the rear end of said tension members including a guide member secured to each bracket, said guide members each having a guide way and a coupling block slidable in said guideways.

2. In a device for hitching a trailer to a truck having a bracket secured to each side thereof, a shaft having its ends supported by said brackets and cables having their forward ends secured to the truck chassis at a point in front of the shaft and passing over the latter; a coupling device comprising a guide member secured to and extending rearwardly from each bracket, the inside surfaces of the brackets having grooves forming guideways, a coupling block, means for slidably securing the ends of the coupling block in the guideways, means for making connection between the rear end of each cable and the corresponding end of the coupling block and coupling mechanism carried by the block.

3. In a device for attaching a trailer to a truck, having a bracket secured to each side of the truck, a guide member extending rearwardly from each bracket, each of said guide members having a guideway, a coupling block having its ends slidable in said guideways, said guideways being rearwardly and downwardly inclined, tension members having their forward ends secured to the truck chassis, and their rear ends connected with the coupling block, means carried by the brackets for supporting the tension members and coupling mechanism carried by said block.

4. In a device for attaching a trailer to a truck comprising, in combination, a pair of spaced brackets, one of which is located on each side of the truck, a shaft extending transversely of the truck and having its ends supported by the brackets, a rearwardly and downwardly inclined guide member secured to the rear of each bracket, each of said guide members having a guideway, a block slidable in each guideway, a coupling mechanism pivotally associated with said blocks, a tension cable on each side of the truck and means for making connection between the rear end of each cable and a block, said cables passing over the shaft and having their forward ends attached to the tractor frame.

In testimony whereof I affix my signature.

JOHN HANS KLEIN.